(12) United States Patent
Giehl et al.

(10) Patent No.: US 12,153,378 B2
(45) Date of Patent: Nov. 26, 2024

(54) PROCESS AND DEVICE FOR PRODUCING A HOLOGRAM, HOLOGRAM AND ILLUMINATION DEVICE FOR A VEHICLE

(71) Applicant: Hella GmbH & Co. KGaA, Lippstadt (DE)

(72) Inventors: Markus Giehl, Jena (DE); Daniela Karthaus, Lippstadt (DE); Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 516 days.

(21) Appl. No.: 17/450,766

(22) Filed: Oct. 13, 2021

(65) Prior Publication Data

US 2022/0035312 A1 Feb. 3, 2022

Related U.S. Application Data

(63) Continuation of application No. PCT/EP2020/057770, filed on Mar. 20, 2020.

(30) Foreign Application Priority Data

Apr. 26, 2019 (DE) ..................... 10 2019 110 833.0

(51) Int. Cl.
*G03H 1/26* (2006.01)
*F21S 41/20* (2018.01)
*G03H 1/02* (2006.01)
*G03H 1/20* (2006.01)

(52) U.S. Cl.
CPC ............ *G03H 1/202* (2013.01); *F21S 41/285* (2018.01); *G03H 1/02* (2013.01); *G03H 2270/21* (2013.01); *G03H 2270/31* (2013.01)

(58) Field of Classification Search
CPC ...... G03H 1/202; G03H 1/02; G03H 2270/21; G03H 2270/31; F21S 41/285; G02H 1/02
USPC .................................................. 359/12, 8, 14
See application file for complete search history.

(56) References Cited

U.S. PATENT DOCUMENTS

| | | | | |
|---|---|---|---|---|
| 4,995,685 A | * | 2/1991 | Armstrong | G03H 1/202 359/30 |
| 6,236,475 B1 | * | 5/2001 | Kihara | G03H 1/04 359/24 |
| 8,599,458 B2 | * | 12/2013 | Dausmann | G03H 1/0248 156/272.8 |
| 2015/0353485 A1 | * | 12/2015 | Hagen | B42D 25/328 560/151 |
| 2018/0074245 A1 | | 3/2018 | Alexander et al. | |
| 2018/0241896 A1 | | 8/2018 | Watanabe et al. | |

FOREIGN PATENT DOCUMENTS

| | | |
|---|---|---|
| DE | 4421306 A1 | 1/1995 |
| DE | 102008057784 A1 | 5/2010 |
| DE | 102016107210 A1 | 10/2017 |
| JP | 05158394 A | 6/1993 |

* cited by examiner

*Primary Examiner* — Audrey Y Chang
(74) *Attorney, Agent, or Firm* — Husch Blackwell LLP

(57) ABSTRACT

A process is provided for producing a hologram that can be applied in particular to a curved carrier, characterized by the process steps of bending a flat, photosensitive recording material and projecting the hologram into the curved recording material.

9 Claims, 4 Drawing Sheets

PROCESS AND DEVICE FOR PRODUCING A HOLOGRAM, HOLOGRAM AND ILLUMINATION DEVICE FOR A VEHICLE

CROSS REFERENCE

This application is a continuation of and claims priority to PCT Application No. PCT/EP2020/057770, filed Mar. 20, 2020, which itself claims priority to German Application No. 10 2019 110833.0, filed Apr. 26, 2019, the entirety of both of which are hereby incorporated by reference.

FIELD OF THE INVENTION

The present invention relates to a process for producing a hologram, a device for producing a hologram, a hologram produced by such a process and/or produced by means of such a device, as well as an illumination device for a vehicle with a hologram of such kind.

BACKGROUND

A process, a device, a hologram and an illumination device of the kind described at the beginning of this document are known from DE 10 2016 107 210 A1. With the process described therein, a hologram is projected into a photosensitive recording material in the form of a flat plate, with the hologram consisting of a plurality of sub-holograms. In this context, the sections of the recording material corresponding to the individual sub-holograms are successively impinged with an object beam and a reference beam. The object beam is modulated by a light modulator with computer-generated hologram information. The hologram or a replica hologram produced with the hologram as master hologram can be integrated into a headlamp of a motor vehicle.

The technology of the volume holograms with the possibility of generating and showing three-dimensional images and contents behind, in or in front of a hologram surface constitutes a very interesting function execution for signal functions. The possibility of transmitting optical functions, such as those of lenses, apertures or reflectors, in holograms expands the field of application of holograms also to illuminating systems. The possibility of transmitting general, large-area holograms onto the limited installation space of lamps and headlamps and the additional requirements placed on differing hologram geometries such as, for example, flat and curved surfaces means that it is preferable to facilitate the processing and creation of holograms for as many circumstances as possible. Correspondingly, a system for illuminating or creating holograms, on the one hand, and a system for replicating or reproducing or for mass production, on the other hand, should be designed to be variable in such a way that makes it possible to create different holograms and hologram geometries in a simple manner.

To make it possible to apply holograms to curved surfaces, there are complex and expensive systems by means of which a large number of sub-holograms with different incident angles of the reference beam can be read in. In this context, the different incident angles of the reference beam are achieved, for example, by reference beams at different angles to the horizontal or vertical. This makes it possible when writing the hologram to take into account the geometry of a curved carrier onto which the hologram is to be applied after it has been produced. FIG. 9 shows a corresponding example schematically indicating how a photosensitive recording material 1 is successively illuminated to produce a master hologram by means of reference beams 2 some of which impinge from different directions. Such a process is not, however, suitable for the mass production of holograms.

BRIEF SUMMARY OF THE INVENTION

The problem underlying the present invention is how to create a process and a device of the kind mentioned at the beginning of the document where the geometry of a carrier onto which the hologram is to be applied can be taken into account by simple means and that is, in particular, suitable for high-volume series production. Furthermore, a hologram produced by such a process and/or produced with such a device and an illumination device for a vehicle with such a hologram are to be specified.

In an example embodiment, a method may include bending of a flat, photosensitive recording material, and projecting the hologram into the curved recording material. In particular, the hologram takes the form of a volume hologram. In this respect, the hologram produced can serve as a master hologram for production of replica holograms or can be a replica hologram. Projecting the hologram into a curved recording material means that no complex and expensive systems are required for producing holograms that are to be applied to curved carriers. In particular, it is possible to avoid reading in with reference beams at different angles.

In other embodiments, it is intended that the holder is designed in such a way that the recording material is curved or can be curved and in that the hologram can be projected into the recording material with the light originating from the light source. In this context, the device can be suitable for implementing an inventive process such that projecting the hologram into a curved recording material means that no complex or expensive systems are required for producing holograms that are to be applied to curved carriers, where in particular it is possible to also avoiding reading in with reference beams at different angles.

It can also be intended that the device comprises at least one roller, preferentially several rollers that can be put into position indirectly or directly at one side of the recording material or, alternatively, that can be put into position indirectly or directly at one or both sides of the recording material in order to bend the recording material. In particular, the at least one roller for bending the recording material can be moved in at least one, preferentially two directions vertical to each other. In this way, it is possible for corresponding movements of the at least one roller to bend the recording material in such a way that it corresponds to the desired hologram geometry. The rollers provide the device with a great degree of versatility and variability both in the illumination of master holograms and in the replication of holograms. This can preferentially facilitate the production of different holograms and hologram geometries with a device by modifying components or rearranging individual parts and components.

Alternatively or in addition, it can be intended that the device comprises at least one sphere or at least one roller bearing, preferentially several spheres or several roller bearings that can be put into position indirectly or directly at one side of the recording material or, alternatively, that can be put into position indirectly or directly at one or both sides of the recording material in order to bend the recording material. In particular, the at least one sphere or the at least one roller bearing can be moved to bend the recording material in at least one, preferentially in two or three, directions vertical to each other. Instead of spheres or roller bearings, other suitable elements can also be used to achieve precise adjustment thanks to having several contact points with a view to shaping geometries as precisely as possible or, as the case may be, forcing the recording material into such geometries. This means that ability to adapt the hologram to the desired geometry can be further improved.

There is the possibility for the device to comprise at least one substrate to which the recording material can be applied, where in the state of the recording material in which it has been applied to the at least one substrate the hologram can be projected into the recording material. The device can serve to produce replica holograms, in particular where a master hologram can be applied to one side of the substrate and the photosensitive recording material to the other side of the substrate. For example, a glass sheet with a defined thickness can be used when replicating master holograms in order to maintain a distance between the master hologram and the recording material suitable for replication, where for example the master hologram is laminated onto the upper side of the glass sheet and the recording material is laminated onto the lower side of the same.

It can be intended that the at least one substrate is bendable such that the substrate can be curved together with the recording material or such that the substrate is curved, where the device comprises in particular a plurality of substrates with different curves. Curvature of the bendable substrate can be achieved, for example, by means of the at least one roller and/or the at least one sphere. If the device comprises substrates with different curves, the suitable substrate can be selected according to the application case.

There exists the possibility for the light source to be designed as a scanning laser light with which a linear or punctiform intensity distribution can be scanned over the master hologram or as a laser light source for producing a flat illumination of the master hologram or as a laser light source for producing laser pulses. Using, for example, a laser light source that scans a linear intensity distribution over the master hologram or implements flat illumination of the master hologram, makes it possible to perform the replication process relatively quickly.

It can intended that the device comprises optical means for shaping the light originating from the light source, where the optical means comprise at least one movable lens. This means that it is possible to perform further adjustments of the illumination process to the desired hologram geometry in addition to bending the recording material.

In an example embodiment, the hologram, in particular the replica hologram is produced by means of an inventive process and/or with an inventive device, where the hologram is intended, in particular, for application to a curved surface and/or for use with a light source with a specified divergence.

In another example embodiment, the illumination device for a vehicle comprises in particular the headlamp for a vehicle, an inventive hologram, where the illumination device comprises in particular a curved surface on which the hologram is arranged.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical components and components with identical functions have been given the same reference numbers.

Figure 9:
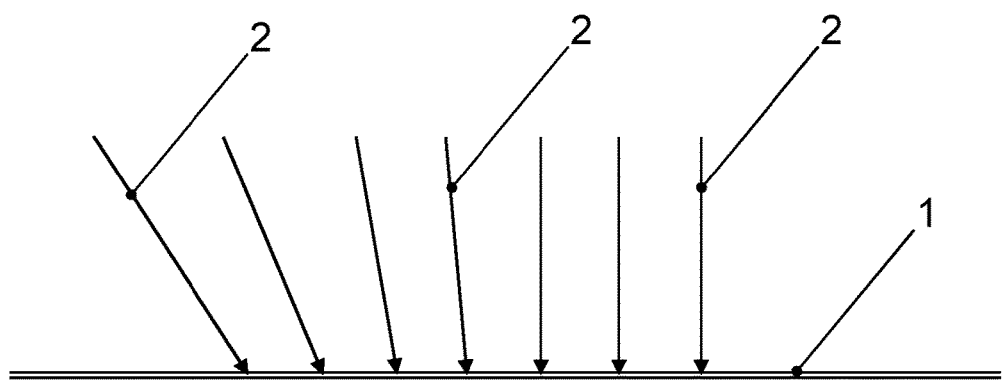
FIG. 9 is a schematic side view of a detail of a device for producing a hologram according to the current state of technology.

FIG. 9 shows the production of a master hologram with a process according to current state of technology in which a photosensitive recording material 1 is illuminated by means of reference beams 2, some of which impinge from different directions. In this way, it is possible to optimize the master hologram produced or a replica hologram produced with the aid of the master hologram for application to a curved substrate.

In order to replicate the master hologram produced using a process according to FIG. 9, it can be illuminated by reference beams some of which impinging from different directions as shown in FIG. 9, where a photosensitive recording material serving to inscribe the replica hologram is arranged parallel to the master hologram. In this context, both the master hologram and the recording material for the replica hologram are of a flat design.

Figure 1:
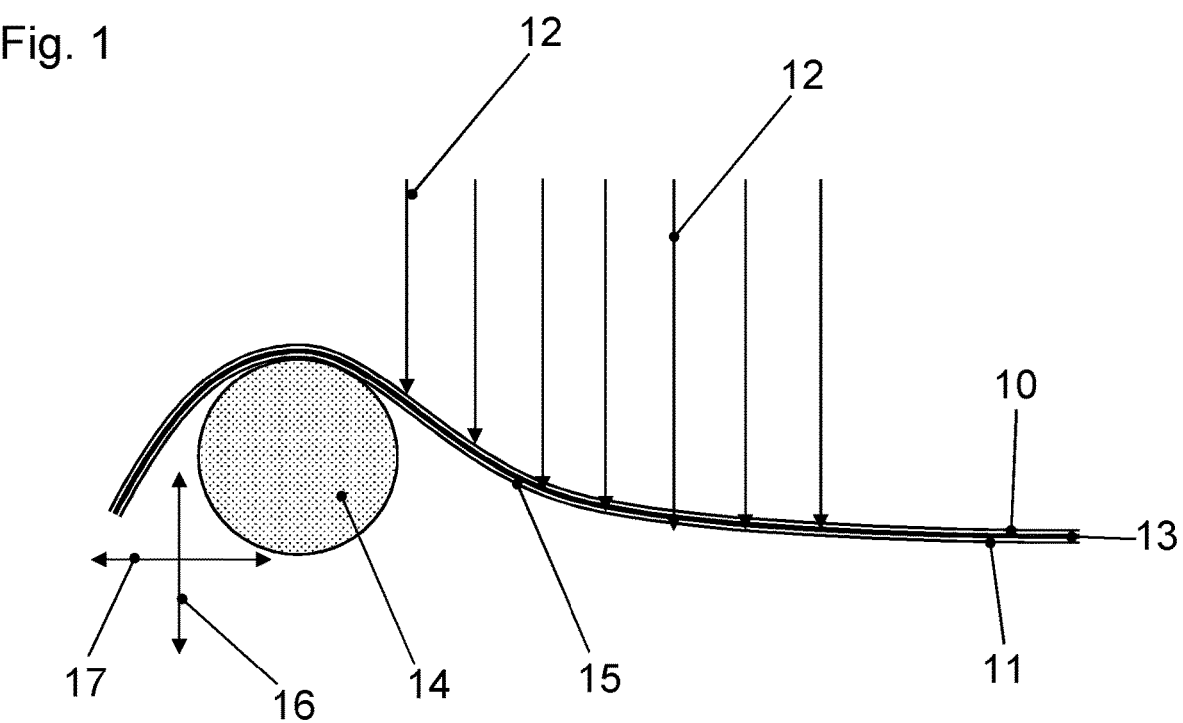
FIG. 1 is a schematic side view of a detail of a first embodiment of an inventive device.

As an alternative to this, an inventive device or an inventive process can achieve an illumination of the master hologram 10 and the recording material 11 without some reference beams 12 impinging from different directions (see FIG. 1). All of the reference beams 12 shown in this first sample embodiment run parallel to each other or parallel to the vertical in FIG. 1. In this respect, the master hologram 10 is, for example, connected, specifically laminated, to the photosensitive recording material 11 for the replica hologram via a flexible substrate 13.

The substrate 13 acts as a flexible and transparent carrier substrate that simplifies positioning the master hologram 10 taking the form of a film and the recording material 11 taking the form of a film relative to each other.

As an alternative, there is also the possibility of the master hologram 10 and the recording material 11 making direct contact with each other, which makes it possible to dispense with the substrate 13 between the two.

The substrate 13 with the master hologram 10 and the recording material 11 is guided over at least one roller 14, which gives rise to a curvature 15 of the substrate 13 and the master hologram 10 or, as the case may be, the recording material 11. The roller 14 can be moved upwards and downwards in FIG. 1 as well as to the right and left (see for example the arrows 16, 17 in FIG. 1), which makes it possible to change the shape and size of the curvature 15. In FIG. 1, the roller 14 makes contact on the lower side of the recording material 11. It can, however, also make contact on the upper side of the master hologram 10.

By deforming the substrate 13 by means of the at least one roller 14, it is possible to reconstruct virtually any geometry of the hologram or of an intended carrier. This means that, in contrast to the current state of technology, changing the reference angle according to FIG. 9 is achieved through the curvature 15 of the master hologram 10 or the recording material 11 instead of reference beams at different angles. To make it possible to reconstruct the variation in the reference angles in the replication process and to nevertheless make it possible to use a flat wave for the illumination, the master hologram 10 and the recording material 11 are curved in such a way that the illumination of the curved master hologram 10 or the curved recording material 11 corresponds to an illumination with variable reference angles.

Figure 2:
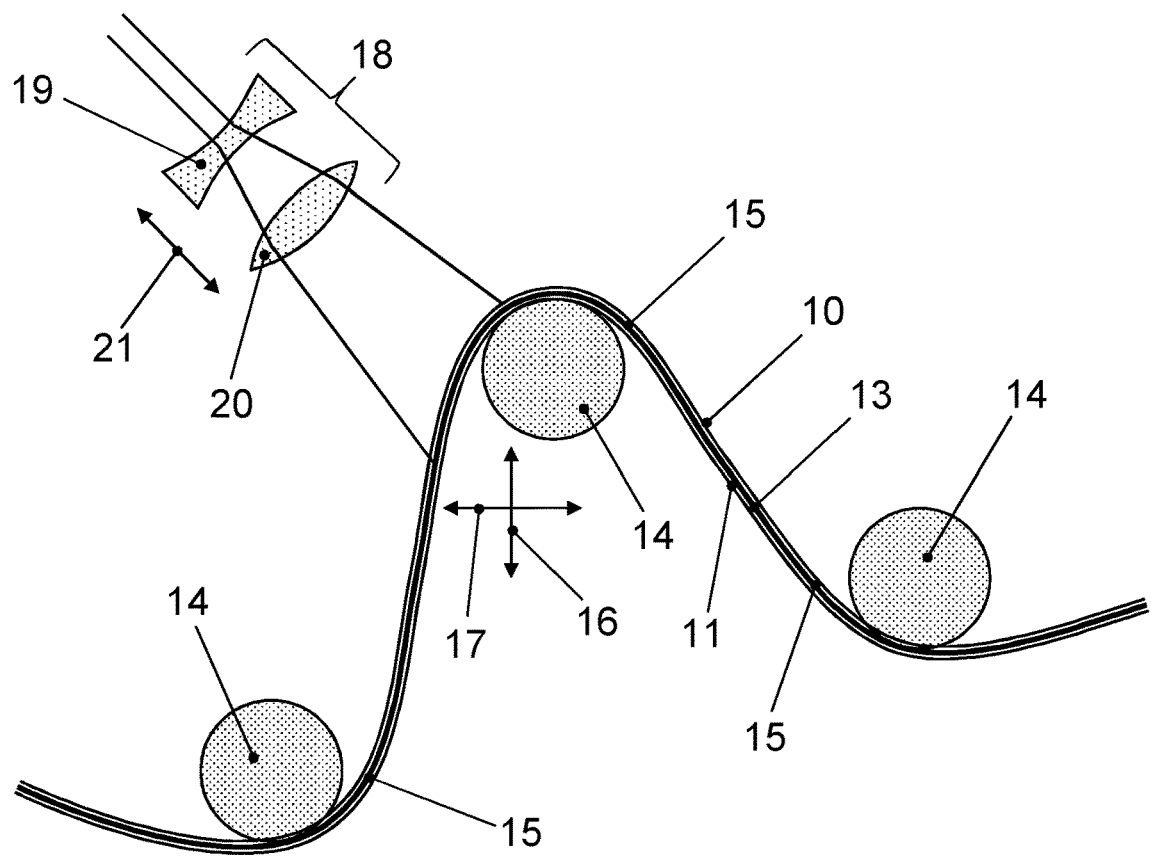
FIG. 2 is a schematic side view of a detail of a second embodiment of an inventive device.

In the second sample embodiment that can be seen from FIG. 2 several rollers 14 are provided for instead of one roller. This makes it possible to generate more complex geometries of the substrate 13 using the master hologram 10 and the recording material 11.

In the sample embodiment shown, a roller 14 makes contact at the lower side of the recording material 11, whereas two rollers 14 make contact on the upper side of the master hologram 10. It is entirely possible to provide for fewer or more than three rollers 14 and/or another arrangement or distribution of the rollers.

The embodiment according to FIG. 2 schematically indicates optical means 18 in addition that comprise at least two lenses 19 and 20. One or both of the lenses 19, 20 shown can be movable in the direction of propagation of the reference beam 12 (see the arrow 21). This makes it possible to implement wide reference angle or divergence angle corrections or also a variable illumination.

Figure 3:
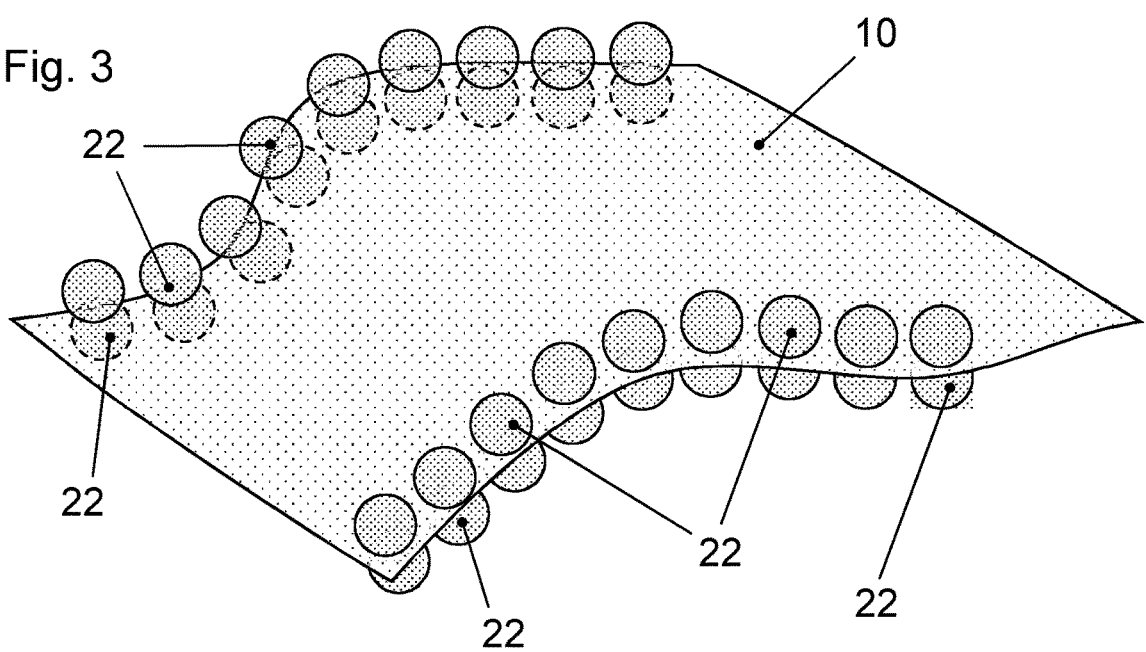
FIG. 3 is a schematic side view of a detail of a third embodiment of an inventive device.

Instead of the rollers 14, the third sample embodiment shown in FIG. 3 provides for a plurality of spheres 22 that are arranged both on the upper sides and on the lower side of the substrate 13 with the master hologram 10 and the recording material 11. The spheres 22 can be movable in three directions vertical to each other. This makes it possible to use a suitable height adjustment of the individual spheres 22 to produce a three-dimensional shape of the substrate 13 with the master hologram 10 and the recording material 11 or, as the case may be, the replica hologram surface.

Both the spheres 22 and the rollers 14 can also serve to press the master hologram 10 and/or the recording material 11 to the substrate 13.

Figure 4:
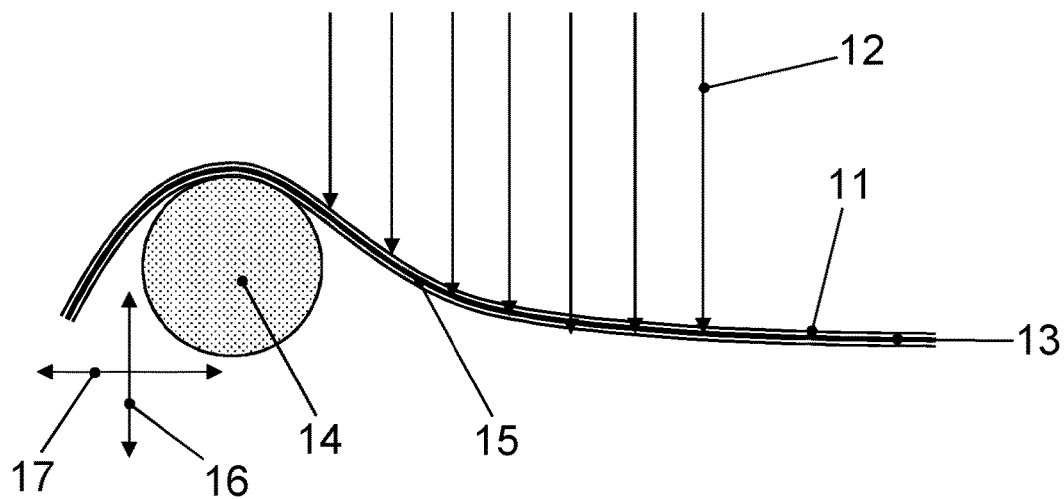
FIG. 4 is a schematic side view of a detail of a fourth embodiment of an inventive device.

FIG. 4 shows an arrangement comparable to FIG. 1. In this sample embodiment, however, corresponding illumination of a photosensitive recording material 11 applied to a substrate 13 produces a master hologram. In this respect, the contour or the curvature 15 of the recording material 11 can correspond to the contour of a carrier or a sheet to which, for example, the hologram is to be applied in an illumination device for a vehicle, in particular a headlamp for a vehicle.

With a corresponding number of rollers 14 or spheres 22, it is possible to reproduce in this respect the contour or curvature 15 of the carrier comparatively well.

Figure 5:
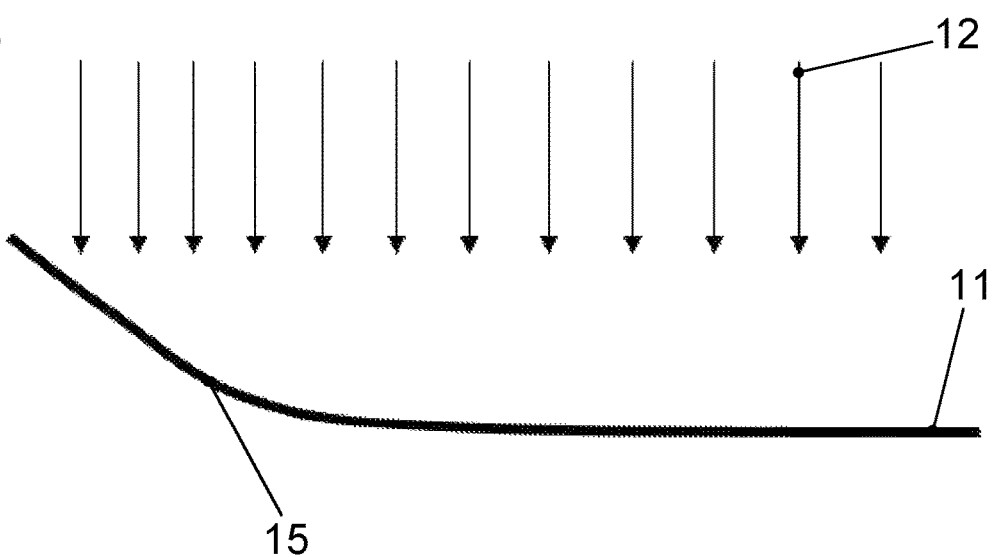
FIG. 5 is a schematic side view of a master hologram produced with a device according to FIG. 4.

FIG. 5 shows schematically a master hologram 10 produced in this manner featuring a corresponding curvature 15. In the following replication for mass production of a large number of replica holograms, the master hologram 10 produced in such a manner is used, for example, in a device depicted in FIG. 7 to copy the holographic information of the master hologram into new recording materials in each case.

Figure 7:
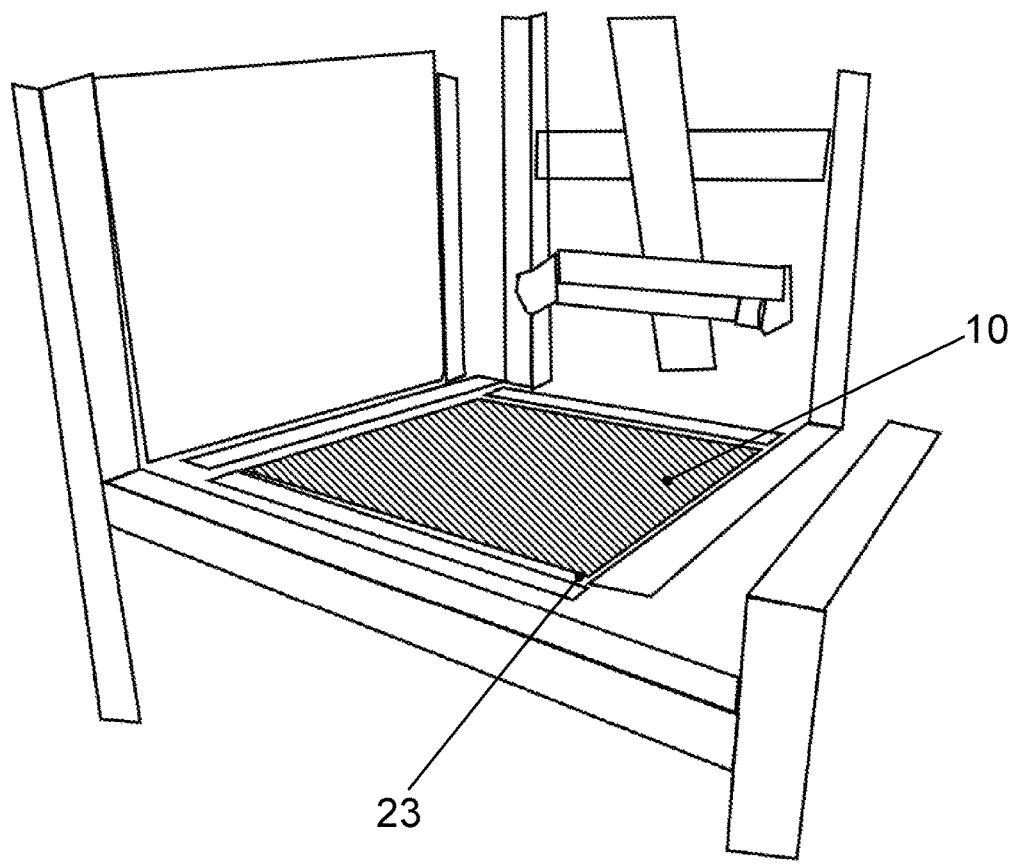
FIG. 7 is a perspective view of a detail of a sixth embodiment of an inventive device.

The device according to FIG. 7 comprises a holder 23 for the master hologram 10 and a feed for the recording material 11. In this context, the recording material 11 can take the form of a film that can be wound off a roll. The device further comprises an illumination device featuring a light source and optical means for shaping the light originating from the light source. In this context, the light source can take the form of a scanning laser light source with which a linear or punctiform intensity distribution can be scanned over the master hologram or take the form of a laser light source for producing a flat illumination of the master hologram or, in the case of diverging reference angles, the form of a laser light source for producing laser pulses.

Figure 6:
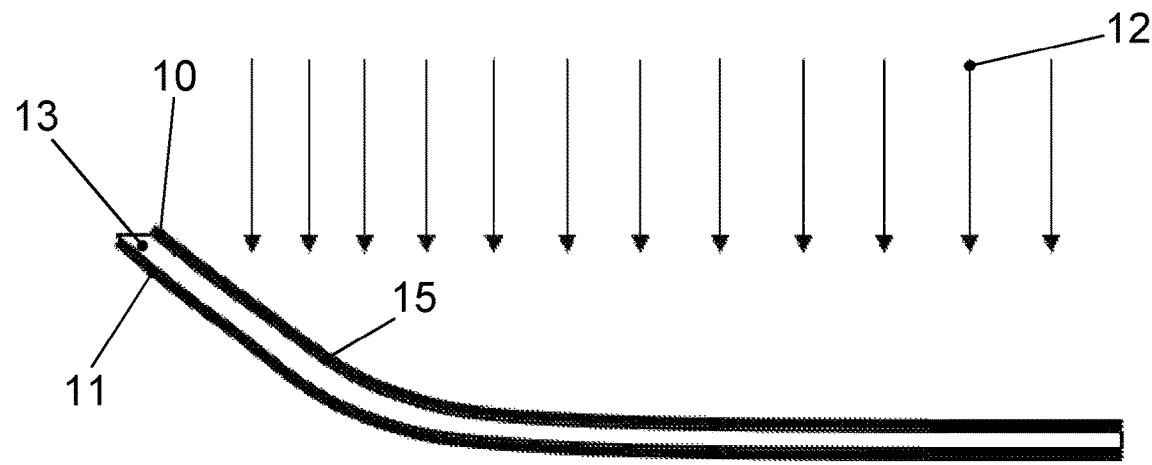
FIG. 6 is a schematic side view of a detail of a fifth embodiment of an inventive device.

The holder 23 for the master hologram 10 and the recording material 11 to be illuminated for the first time for creating the replica hologram must be designed in such a way that a defined distance between the master hologram 10 and the new recording material 11 is maintained to each other. In this context, it is possible to use a glass sheet with a defined thickness acting as substrate 13 onto one side of which, the upper side for example, the master hologram 10 has been laminated and onto the other side of which, for example the lower side, the recording material has been laminated. This is shown as an example in FIG. 6.

Figure 8:
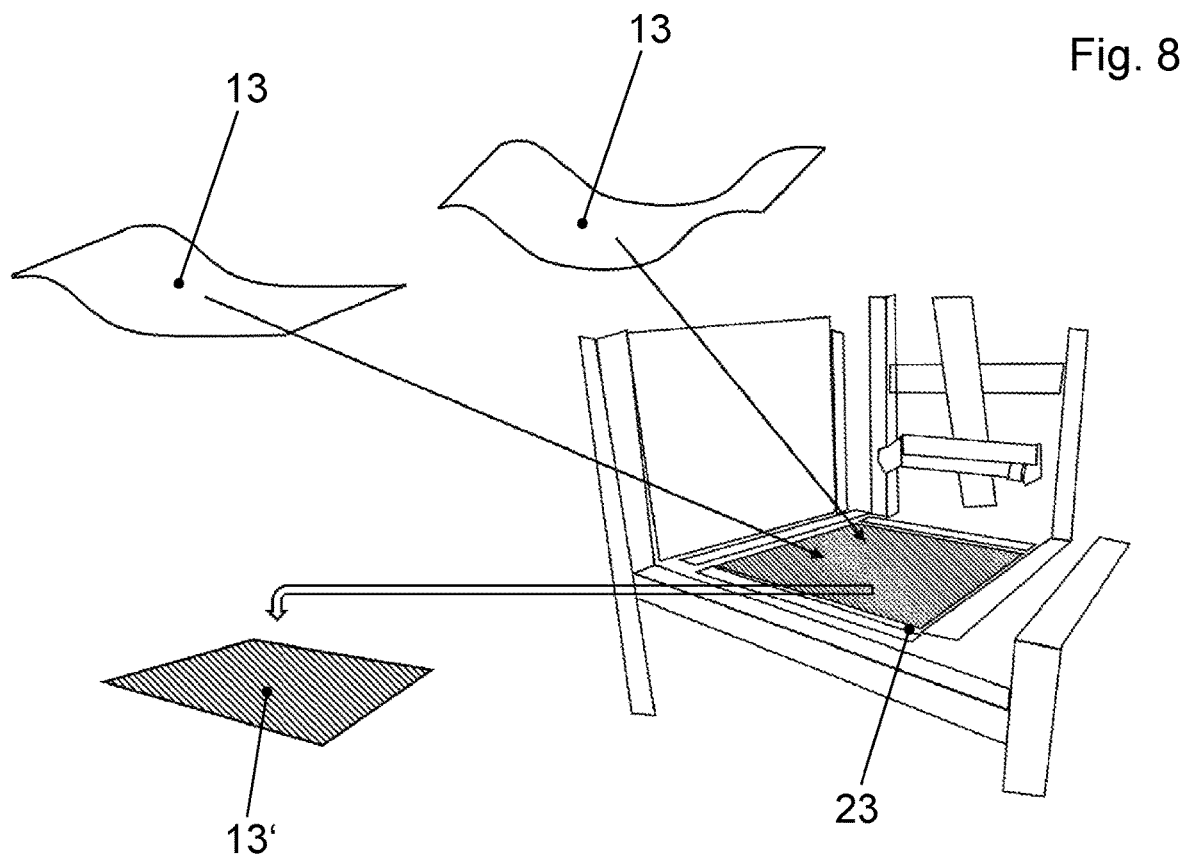
FIG. 8 is a perspective view of a detail of a seventh embodiment of an inventive device.

In the current state of technology, flat, planar glass sheets are always used as substrate or carrier. In the embodiment according to FIG. 8, it is indicated that the holder 23 of the device for replication purposes is designed in such a way that curved and bent geometries can be specified as substrate or carrier. In this context, it is possible, for example, to use bendable, flexible glass sheets as a substrate 13 that are held in a shaping holder 23. FIG. 8 further indicates that a conventional holder with a flat, planar sheet acting as a substrate 13' can be replaced in the device for replication purposes with the bendable substrate 13.

Instead of a bendable glass sheet, a rigid, curved glass sheet can also be used as substrate 13, especially when the thickness of the flexible glass sheet is not sufficient for the defined distance between the master hologram 10 and the new recording material 11. The bending or curving of glass sheets is known, for example, from curved windows, vehicle screens or curved displays and televisions.

In this context, several, specifically any number of holders with glass panes with different curves acting as substrate 13 may be provided for in order to facilitate common production on a corresponding replication device for different geometries and projects. The necessary variability in the mechanics, in particular the guides for contact rollers in order to laminate the recording material onto the curved glass sheet is to be provided for in order to be able to use the different geometrical holders and glass sheets.

LIST OF REFERENCE NUMBERS 1 photosensitive recording material
2 Reference beam
10 Master hologram
11 photosensitive recording material
12 Reference beam
13 Substrate
13' Substrate according to the current state of technology
14 Roller
15 Curvature
16, 17 Arrows to indicate the movability of the roller
18 Optical means
19, 20 Lens
21 Arrow to indicate the movability of the lens 22 Sphere
23 Holder

We claim:

1. A process for producing a hologram, the process comprising the following process steps:
   bending a flat, photosensitive recording material by moving at least one roller or at least one sphere in at least two directions; and
   projecting the hologram onto a curved recording material.

2. The process in accordance with claim 1, wherein the hologram produced acts as a master hologram for production of replica holograms, or in that the hologram produced is a replica hologram.

3. A device for producing a hologram, the device comprising:
   a light source for generating a laser beam;
   a holder for a flat, photosensitive recording material;
   at least one roller or at least one sphere positioned and located directly adjacent or indirectly adjacent to the photosensitive recording material, the at least one roller or the at least one sphere being moveable in at least two directions to bend the photosensitive recording material; and
   wherein the hologram is projected onto the photosensitive recording material with the light originating from the light source.

4. A process for producing a hologram using the device in accordance with claim 3, the method comprising the steps of:
   bending of a flat, photosensitive recording material; and
   projecting the hologram onto a curved recording material.

5. The device in accordance with claim 3, wherein the device comprises at least one substrate to which the recording material is applied; and
   wherein when the recording material is in a state of being applied to the at least one substrate, the hologram is projected onto the recording material.

6. The device in accordance with claim 5, wherein the at least one substrate is bendable such that the substrate is bent together with the recording material, or the substrate is curved,
   wherein the device further comprises a plurality of substrates curved in different ways.

7. The device in accordance with claim 3, wherein the device produces replica holograms, wherein a master hologram is applied to a first side of a substrate, and wherein the photosensitive recording material is applied to a second side of the substrate.

8. The device in accordance with claim 7, wherein the light source is a scanning laser light with which a linear or punctiform intensity distribution is scanned over the master hologram, or as a laser light source for producing a flat illumination of the master hologram, or as a laser light source for producing laser pulses.

9. The device in accordance with claim 3, wherein the device comprises a moveable lens for shaping the light originating from the light source.

* * * * *